United States Patent [19]
Appleton

[11] 3,816,638
[45] June 11, 1974

[54] ELECTRICAL BOX GROUND SCREW MOUNTING

[76] Inventor: Arthur I. Appleton, c/o Appleton Electric Company, 1701 W. Wellington, Chicago, Ill. 60657

[22] Filed: July 3, 1972

[21] Appl. No.: 268,695

[52] U.S. Cl. .................................. 174/51, 339/269
[51] Int. Cl. ........................................... H02g 3/08
[58] Field of Search ........ 174/51, 78, 58; 339/14 R, 339/14 L, 269

[56] References Cited
UNITED STATES PATENTS

| | | | |
|---|---|---|---|
| 1,813,448 | 7/1931 | Horton | 174/51 UX |
| 1,880,081 | 9/1932 | Frederickson | 174/51 |
| 2,752,217 | 6/1956 | Simon | 174/58 UX |
| R18,773 | 3/1933 | Thomas | 174/51 |

Primary Examiner—Bernard A. Gilheany
Assistant Examiner—David A. Tone

[57] ABSTRACT

In an electrical box having a hole in one side for receiving a ground screw, the portion of the wall immediately surrounding the ground screw hole is formed to entrap a ground wire placed under the ground screw so that the ground wire cannot escape from under the head of the ground screw as the ground screw is tightened down thereon.

2 Claims, 5 Drawing Figures

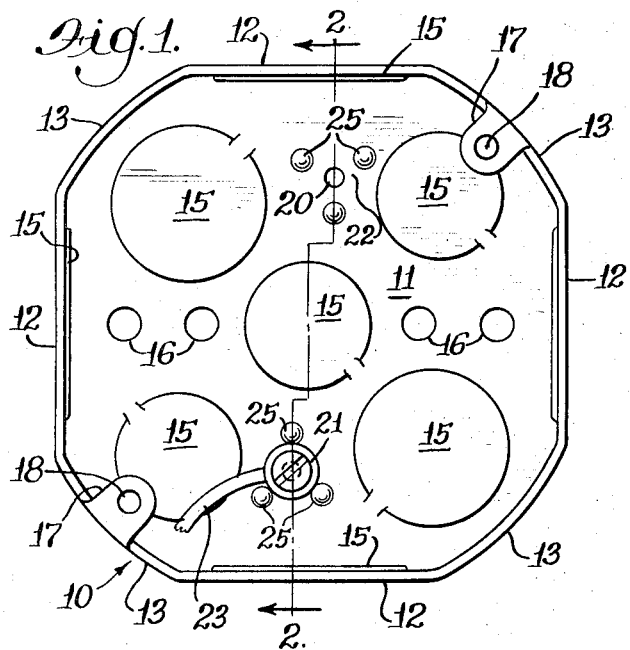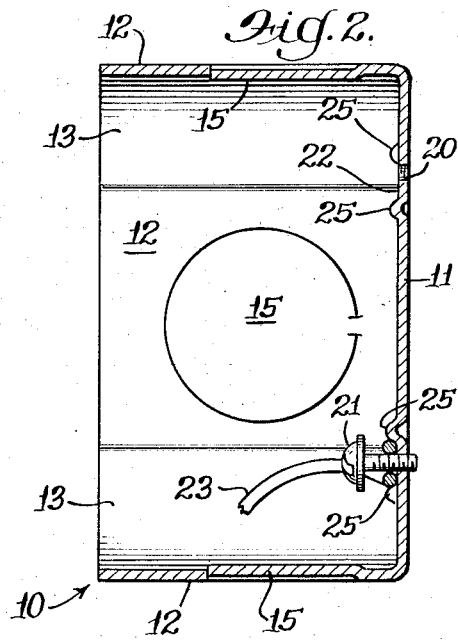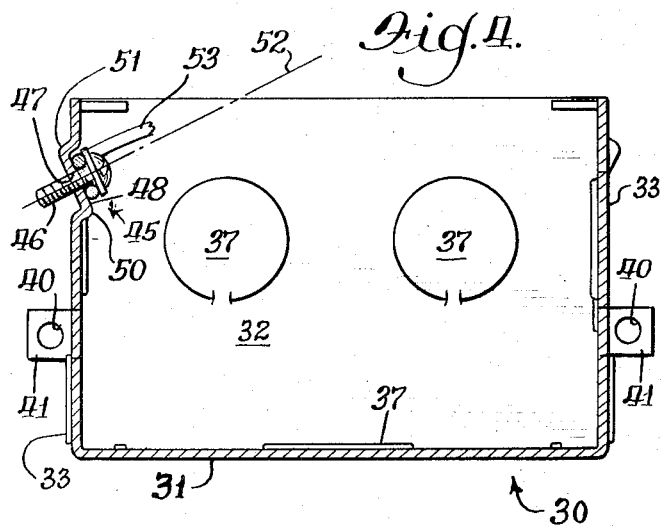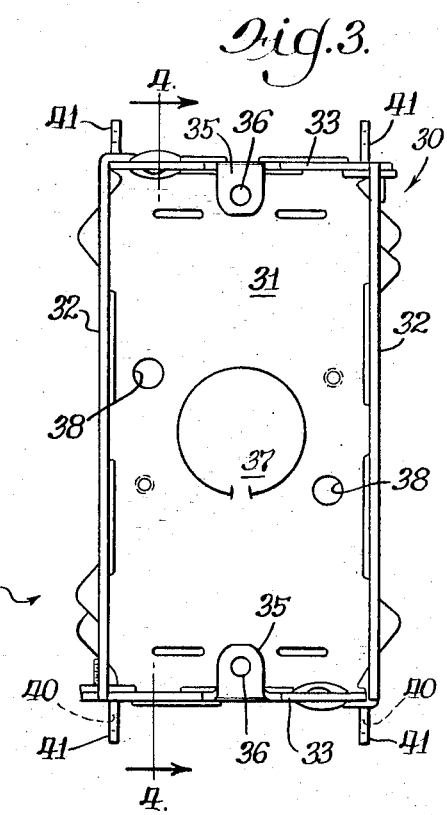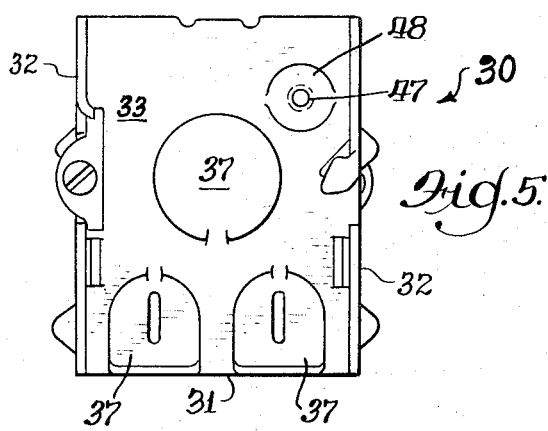

ELECTRICAL BOX GROUND SCREW MOUNTING

BACKGROUND AND SUMMARY OF THE INVENTION

In making a ground connection between a piece of electrical paraphernalia (such as a switch) and ground, the electrical contact therebetween is frequently facilitated by means of a screw. In the most common case, when the electrical box itself is made of metal and grounded, one or more sidewalls of the box are punched and threaded for receiving the ground screw, and the function of the ground screw is merely to drive the ground lead from the electrical piece securely into the metal box to ensure a good electrical contact therebetween. Normally, a little loop is made with the ground lead, and the loop is slipped around the threads of the ground screw which may be already partially advanced into the threaded hole awaiting tightening. As will be understood by those who have engaged in wiring jobs, the tightening down of a screw head on a piece of wire sometimes causes the wire to "spread out" or be forced away from under the screw head whereupon a poor if any contact is made between the ground lead and the electrical box.

The present invention seeks to avoid this possibility by properly contouring the box near the threaded ground hole so as to entrap the wire lead between a projection or depression of the box wall and the threads of the ground screw. This projection or depression is so placed as to not interfere with the head of the ground screw, but lies sufficiently close relative thereto to prevent the ground lead from getting out therebetween. In any event, a person making the ground connection can be confident that the wire has not moved out from under the head of the ground screw, and also that a good ground is uniformly achieved from all electrical boxes so equipped.

DESCRIPTION OF THE DRAWINGS

FIG. 1 is a view looking into the interior of a standard electrical box containing the principles of the present invention;

FIG. 2 is a cross-sectional view of the electrical box shown in FIG. 1 taken substantially along the lines 2—2 of FIG. 1;

FIG. 3 is a view looking into the interior of a different type of standard electrical box also incorporating the principles of the present invention;

FIG. 4 is a cross-sectional view of the electrical box shown in FIG. 3 taken substantially along the lines 4—4 of FIG. 3; and FIG. 5 is an end view of the electrical box shown in FIG. 3.

DESCRIPTION OF SPECIFIC EMBODIMENTS

Referring now to the drawings, there is shown in FIGS. 1 and 2 a standard electrical box, generally 10. Electrical box 10 includes a rear wall 11, a plurality of straight sidewalls 12 extending forwardly from the rear wall, and four curved corner walls 13 also extending forwardly from the rear wall and interconnecting side walls 12 to thus form a generally cup-shaped object as best understood by viewing FIG. 2. These details of construction of such an electrical box are old and well known, but a brief description is here included, merely for the purpose of completeness. Each of the walls is provided with one or more knockouts 15, well known in the art, and rear wall 11 includes a plurality of holes 16 which can be used to drive nails through to hold the box in place in a wall or the like. Two oppositely spaced corner walls 13 carry a tab 17 at their outermost end which is bent over and tapped as at 18 so that a cover plate (not shown) with appropriately spaced holes therein can be affixed to the open side of the electrical box 10 to form an enclosure.

As is conventional, rear wall 11 includes at least one tapped hole 20 for receiving a ground screw 21 therein, and it is here where the subject of the present invention is involved.

Immediately adjacent the tapped hole 20 is a substantially flat portion 22 of the rear wall 11 against which a ground lead 23 may be compressed. To ensure that ground lead 23 remains directly under the head of ground screw 21 as ground screw 21 is tightened down thereon, rear wall 11 is provided with entrapment means 25 here shown as three protrusions or embossments 25 jutting inwardly into the box and evenly spaced around the flat portion 22 surrounding tapped hole 20. Although each of the embossments 26 is, in its entirety, a protrusion extending into the box, that portion or sidewall of each embossment which faces the ground screw can be thought of as a depression relative to the top or peak of the protrusion. These projections extend inwardly into the box from the inner surface of the rear wall a distance less than the diameter of the smallest wire which would be used with the box, and they are spaced radially outwardly less than the radius of the screw head on ground screw 21. Thus, when ground screw 21 is drawn tight, ground lead 23 is clamped securely to rear wall 11 and is held in close proximity to the threaded shank of ground screw 21.

It will be understood that the projections comprising entrapment means 25 could project further into the box if they were spaced radially outwardly of the head of ground screw 21. It will similarly be understood that any number of projections of any desirable shape could be incorporated to achieve the principles of the present invention.

Using entrapment means 25 is generally no more difficult than if they were not included in the electrical box. A loop is made in the ground lead 23 with appropriate pliers, the ground screw 21 is checked to be sure it is out far enough to receive the loop thereunder, the loop is hooked around the ground screw, and the ground screw is drawn up tight with a screwdriver. Once the head of the ground screw 21 is drawn sufficiently far down that the distance between the head and one of the projections 26 is less than the diameter of the wire forming the ground lead, there is no chance for the loop of the ground lead to spread out or open up and move out from under the head of the ground screw.

Referring now to FIGS. 3–5, there is shown the invention in a modified form and in a slightly different location in an electrical box, although it will be understood that either of the forms described herein can be used in any location as well as other forms falling within the spirit and scope of the claims. In FIG. 3 there is shown an electrical box, generally 30, including a rear wall 31, two elongate side walls 32, and two shorter end walls 33. Walls 31–33 are joined together to form a box having one side open, and end walls 33 each contain a tab 35 bent inwardly which has a tapped hole 36 therein for securing a cover plate (not shown). Each of the walls includes at least one knockout 37, and various mounting means are provided for mounting the box in a desirable location, these mounting means including holes 38 in the rear wall and holes 40 in outwardly extending tabs 41 of side walls 32.

In this particular embodiment, the ground lead entrapment means 45 and ground screw 46 are located in end walls 33. A tapped hole 47 for receiving ground screw 46 is disposed at the middle of a circular area or flat portion 48, area 48 being formed by embossing the innermost end 50 relative to the inside of the electrical box and debossing the outer end 51 of circular area 48 to form an entrapment means. In so doing, it will be noticed that the center line or axis 52 of tapped hole 47, which comprises a line perpendicular to area 48, extends out of the open side of the box without intersecting any of the other sides. The angle that circular area 48 makes with end wall 33 is low enough to be relatively troublefree from a manufacturing standpoint, yet high enough to make the ground screw readily accessible by an electrician and his standard, straightshanked screwdriver.

In this embodiment, the head of the ground screw 46 is of lesser diameter than the circular area 48. Thus, a ground lead 53 which is wrapped around the threaded portion of ground screw 46 becomes entrapped by virtue of the debossed outer end of area 48 when ground screw 46 is screwed partially down. As ground screw 46 is tightened, this debossing prevents ground lead 53 from slipping out from under the head of ground screw 46 under its crushing load, and the embossed or raised portion facilitates admitting the ground lead into the debossed area and around the ground screw. However, it will be appreciated that this embodiment does not absolutely require an embossed portion.

I claim:

1. In an electrical box having a plurality of side walls and a bottom wall formed to contain a piece of electrical paraphernalia, said box including at least one wall with a flat portion containing a threaded hole therein for receiving a ground screw having a head sufficiently large to hold down a ground lead placed thereunder, the improvement comprising:

said flat portion comprising a relatively small part of said one wall and being formed therefrom into a canted relationship relative to the rest of said one wall, a discreet part of said one wall being depressed relative to the rest of said one wall as a result of said canting and forming entrapment means between said flat portion and the rest of said one wall for guiding said ground lead adjacent said threaded hole when said ground screw is contained loosely therein, and for preventing said ground lead from escaping from under the head of said ground screw as the screw is tightened down on the ground lead, said flat portion being sufficiently canted relative to said one wall such that a perpendicular thereto intersects no other box wall.

2. The improvement as set forth in claim 1, wherein said flat portion is located in the outermost portion of a side wall and away from said bottom wall whereupon it is relatively free of said paraphernalia and is therefore readily accessible.

* * * * *